V. KRAMP & M. NEUBER.
SEWING LAMP.
APPLICATION FILED NOV. 9, 1914.
1,137,985.
Patented May 4, 1915.
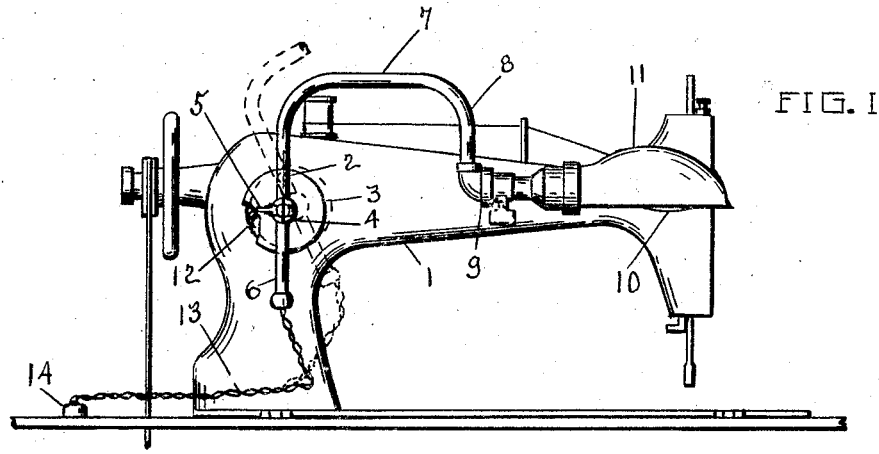
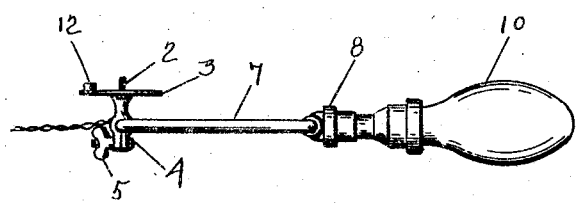
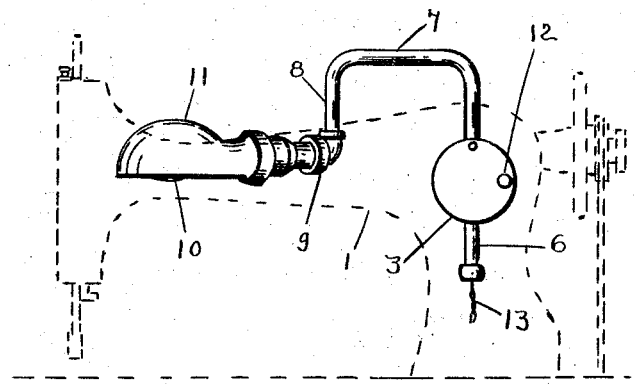

UNITED STATES PATENT OFFICE.

VICTOR KRAMP AND MAX NEUBER, OF TOLEDO, OHIO.

SEWING-LAMP.

1,137,985.  Specification of Letters Patent.  Patented May 4, 1915.

Application filed November 9, 1914. Serial No. 870,968.

*To all whom it may concern:*

Be it known that we, VICTOR KRAMP and MAX NEUBER, citizens of the United States of America, residing at Toledo, Lucas county, Ohio, have invented a new and useful Sewing-Lamp, of which the following is a specification.

This invention relates to illumination directing mechanism.

This invention has utility when incorporated in a lamp support in connection with sewing machines.

Referring to the drawings: Figure 1 is a side elevation of the back, or the side of a sewing machine arm opposite the operator, having the lamp support adapted thereto; Fig. 2 is a plan view of the lamp support features disconnected from the sewing machine arm; and Fig. 3 is a front view of the lamp support positioned forward of the sewing machine arm, the arm being shown in dotted lines.

The arm 1, say of a power sewing machine, is provided with the usual opening for access to the working parts from the rear side of the sewing machine head. Just above said opening is the screw 2 pivotally mounting the side cover plate 3 upon the sewing machine arm 1. The cover plate 3 is provided centrally of its outer face with the clamp 4 having the thumb nut 5 adjustable to frictionally grip the support section 6. The support embodies the supporting section 6, the offset section 7 and the drop section 8 having the angular termination 9 carrying the lamp 10 provided with a reflector or shade 11. The support sections 6, 7, 8, combine to form a return bend outline sufficient to easily clear the arm 1 when the lamp is used forward of the arm 1. The top pivot 2, being above the clamp 4, and the support having an outward extension therefrom, tends to swing downward. This downward drop of the lamp 10 is limited by the stop 12 engaging the side of the opening in the arm to hold the plate 3. However, as this limits only the downward swing of the support, the machine operator may easily at any time shift the lamp for use of the light in front of the arm from the normal position back of the arm directing the light rays upon the work being sewed. Lifting of the lamp 10, will rock the plate 3 upon its pivot 2, as shown in dotted lines, Fig. 1, and when the lamp 10 is high enough to clear the arm 1, it may be pulled forward, as permitted by the frictional clamp 4, to the desired position forward of the arm 1, to enable the operator to do hand sewing with good light, or any other duties incidental to the handling of the machine. This swinging up and forward constitutes a universal joint or mounting for the lamp support.

As positioned, the lamp may be at the most advantageous location as to the work being done, is entirely out of the way as to the material being handled or operated upon, and in no way encumbers the machine or table space. The clamp 4 permits of such height adjustment as may be desired. With electric lamp 10, the flexible conductors 13 may extend from some plug 14 disposed to be away from interference with the machine manipulation or operation.

For inspection of the machine mechanism below the table, the head may be rocked backward, and the lamp back of the machine be in such proximity to the arm as to permit such tilting of the arm. The normal use of the cover plate 3 is still permitted.

The device may be readily attached to the sewing machine by the screw 2 or the support by the clamp 4, and as easily removed.

What is claimed and it is desired to secure by Letters Patent is:

1. A machine arm, a side cover plate therefor pivotally mounted to swing in its plane, a clamp on the cover plate, a return bend support mounted by said clamp to swing in a plane transverse of the plane of the cover plate and rockable with the cover plate to permit movement from one side of the arm to the other, said support having an angular termination, and a lamp carried by said termination.

2. A lamp, a return bend support therefor, a machine arm, a mounting on said arm for the support to bring the lamp in position back of the arm, and means permitting rocking of the support as to the arm for bringing the lamp in position in front of the arm by swinging the lamp over the arm.

In witness whereof we affix our signatures in the presence of two witnesses.

VICTOR KRAMP.
MAX NEUBER.

Witnesses:
GEO. E. KIRK,
C. H. RAUCH.